J. H. JOHNSON,

Assignor to E. B. PRESTON.

Hose-Nozzle.

No. 8,951. Reissued Oct. 28, 1879.

*Witnesses:*

F. B. Townsend

H. W. Munday

*Inventor:*

John H. Johnson per Munday & Evarts

*Attorneys.*

N. PETERS, PHOTO-LITHOGRAPHER, WASHINGTON, D. C.

UNITED STATES PATENT OFFICE.

JOHN H. JOHNSON, OF CHICAGO, ILLINOIS, ASSIGNOR TO EVERETT B. PRESTON, OF SAME PLACE.

IMPROVEMENT IN HOSE-NOZZLES.

Specification forming part of Letters Patent No. 198,515, dated December 25, 1877; Reissue No. 8,951, dated October 28, 1879; application filed October 6, 1879.

*To all whom it may concern:*

Be it known that I, JOHN H. JOHNSON, of the city of Chicago, Cook county, State of Illinois, have invented a new and useful Improvement in Hose-Nozzles, of which the following is a full description, reference being had to the accompanying drawings, in which—

Figure 1:
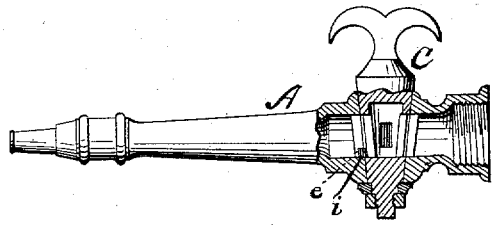
Figure 2:
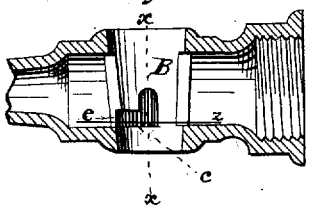
Figure 3:
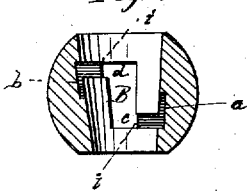
Figure 4:
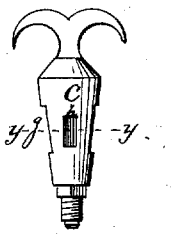
Figure 5:
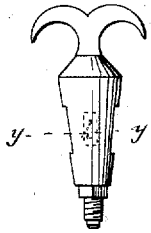
Figure 7:
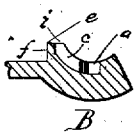
Figure 6:
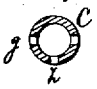

Figure 1 is an elevation, the main portion being shown in section; Fig. 2, an enlarged section with the plug removed; Fig. 3, a section at *x x* of Fig. 2, looking to the left. Figs. 4 and 5 show the plug in different positions; Fig. 6, a section at *y* of Fig. 4; Fig. 7, a section at *z* of Fig. 2. Figs. 2, 3, and 7 are enlarged.

This improvement relates to that class of hose-nozzles which are so constructed that a solid stream can be thrown, and also so that by changing the position of the plug or cock the water will escape from the nozzle in the form of a spray instead of a solid stream.

In the drawings, A represents the nozzle; B, the barrel, which receives the plug or cock; *a b*, recesses in the barrel upon opposite sides thereof. *c d* are continuations of the recesses *a b*, and are, as shown, at right angles to *a b*. These passages *c d* do not open directly into the passage through the nozzle, but open into the plug, which is provided with openings, so arranged that the water can pass through the plug into the main channel in the nozzle when the plug is in proper position.

The wall of the barrel extends across the passages *c d*, as shown at *e*, Fig. 2. The wall at the end of the passage *c* is made straight, or nearly straight, as shown at *f*, Fig. 7.

C is a three-way cock or plug, having a passage, *g*, through it, and also a passage, *h*, opening into the passage *g*.

*i*, Fig. 1, shows the outlet from the passage or chamber *c* to the main passage through the nozzle. There is a similar outlet from the passage *d*.

When the plug is in the position shown in Fig. 1, the passage *d* is in line with the passage through the nozzle, and the water will flow through, emerging in a solid stream, as usual; but if the plug or cock be turned so as to bring the opening *h* opposite to the inlet, the direct flow of the water through the nozzle will be cut off, and it will pass first through the opening *h* into the passage *g* through the plug or cock; and when the plug is in this position the water will pass into the two recesses *a b* and through the passages *c d*, and, coming in contact with the wall *f*, will be deflected and thrown into the main passage, passing through it spirally, and emerging therefrom in the form of a spray.

The water can be entirely shut off by turning the plug, so that the portion opposite the opening *h* will close the opening into the barrel.

I am aware that hose-nozzles have been made having two passages from the barrel to the main channel, but not opening directly from the barrel into the main channel. When so constructed these passages are liable to become filled up by obstructions passing through the water, which cannot be easily removed. With my construction this cannot happen, for the moment the plug is removed the passages are all exposed to view.

The peculiar forms of the passages *a b c d* give to the water a spiral movement, unaided by the form of the main channel or passages leading from the barrel into such main channel.

What I claim as new, and desire to secure by Letters Patent, is—

1. In a hose-nozzle, the barrel B, provided with recesses *a b* and passages *c d*, in combination with the three-way plug C, all constructed and operating substantially as and for the purposes specified.

2. A plug-nozzle provided with spray-producing passages located directly at the plug and within the plug-chamber, whereby said passages are exposed when the plug is removed, substantially as specified.

JOHN H. JOHNSON.

Witnesses:

IVES W. MCGAFFEY,
H. M. MUNDAY.